Patented Aug. 24, 1943

2,327,882

UNITED STATES PATENT OFFICE 2,327,882

BITUMINOUS BASE DISPERSION FOR USE IN THE PRODUCTION OF COLORED BITUMEN DISPERSIONS

Leonard Gowen Gabriel and John Alfred Rawlinson, London, England

No Drawing. Application August 16, 1940, Serial No. 352,944. In Great Britain August 25, 1939

5 Claims. (Cl. 106—277)

This invention relates to the preparation of bituminous base dispersions for use in the production of colored bitumen dispersions suitable for painting purposes, especially in road construction, for camouflaging purposes, for example for camouflaging aerodromes, hangars and military buildings, and for coloring concrete, and to the production of such colored dispersions.

British Specification No. 514,818 describes a colored bitumen dispersion which contains less than 25% by weight and preferably less than 15% by weight, e. g. about 10 to 12% by weight of bitumen, together with an insoluble pigment and a highly swellable or colloidal substance, such as bentonite, serving to suspend the pigment. It is an object of the present invention to provide an improved process for the preparation of stable bituminous base dispersions for use in the production of colored bitumen dispersions of this type, in which, by using a very large quantity of pigment in proportion to the quantity of bitumen, even as much as about 1 part by weight of pigment to 1 part by weight of bitumen, the black color of the bitumen is completely obliterated by the pigment, as a result of which the diluted dispersions has a very intense color. The small amount of bentonite is added only in order to keep the pigments suspended in the aqueous dispersion which has a very low viscosity, so as to preclude as much as possible a sedimentation of the pigments.

According to this invention a process is provided for the preparation of stable bituminous dispersions for use in the production of colored bitumen dispersions in which bitumen or an aqueous bitumen dispersion is mixed with an aqueous dispersion or slurry of a highly swellable or colloidal substance, such as bentonite, so as to form a stable dispersion, the total amount of water present in the two components being such that the resultant dispersion contains not more than 25% by weight and preferably less than 15% by weight, for example about 10 to 12% by weight, of bitumen. If desired the preparation of the bentonite slurry may be facilitated by the use of a small proportion of a suitable wetting agent. Stable base dispersions which can be stored and shipped offer the advantage that a paint may be easily prepared wherever and whenever needed without special equipment, and thus the prefabrication and storage of many shades and colors is obviated.

It should be understood that the percentage of bitumen is calculated on the weight of the dispersion excluding the highly swellable or colloidal substance and added pigment.

Whilst bitumen may be employed as such in the above process, it is preferred to employ bitumen emulsions. Semi-stable or labile emulsions may be employed if adequate precautions are taken, but in general it will be preferable to employ bitumen emulsions of the stable type.

According to this invention also a process is provided for the production of colored bitumen dispersions which consists in mixing a pigment with a bituminous base dispersions prepared as described above.

Either dry pigments or water-base pigments may be employed; in the latter case rather more concentrated base dispersions must of course be employed so as to give the same content of water in the final colored dispersion.

It is found that the base dispersions accept the addition of pigment with very little agitation to give a complete dispersion. Satisfactory dispersions may be produced by simply stirring the pigment into the base dispersion for a short time. Traces e. g., on the order of about 0.05% of the emulsion of such substances as aluminium sulphate, which cause flocculation of bentonite, or similar suspensions, may be added to effect control of the consistency of the final product, if desired.

Normally the bituminous base dispersions will be mixed with quantities of pigments equal to or slightly smaller than the bitumen content. Suitable pigments are, e. g. red iron oxide for the manufacture of a red, chromium oxide green for the manufacture of a green and bone black for the manufacture of a black bitumen dispersion. By using a fairly large quantity of pigment in proportion to the quantity of bitumen, the black color of the bitumen is completely obscured by the pigment, as a result of which the dispersion has a very intense color.

Asphalt, tar, resin and pitch, as well as other bituminous substances, are regarded as falling within the term "bitumen" as used herein.

The following example illustrates how the invention may be carried into effect:

A basic emulsion is first prepared by emulsifying 55 parts by weight of Venezuelan bitumen, penetration 200, in 45 parts by weight of a solution containing 2% by weight of casein and 0.35% by weight of caustic potash, using a Hurrell mill in the well-known manner. 3 parts by weight of bentonite are sifted into 46 parts by weight of water and dispersed therein by mechanical stirring for 10 minutes at room temperature. 20 parts by weight of the basic emulsion is then added to the bentonite dispersion and the mechanical stirring continued for about 1 minute at room temperature. The resultant bituminous base dispersion is smooth and creamy; the viscosity increases slightly on standing and after 24 hours is of a similar order to that of the original basic emulsion. The dispersion shows no sign of separation of aqueous phase or sedimentation on standing.

For the production of a dark red paint, 7 parts by weight of red oxide pigment dispersed in 24 parts by weight of water are mixed by mechanical stirring for a short time with 69 parts by weight of the bituminous base dispersion produced as described above and 0.2 part by weight of 20% aluminium sulphate solution. This amounts to 0.04% by weight of aluminum sulfate calculated on the emulsion.

For the production of dark green paint, 7 parts by weight of chromium oxide pigment and 4 parts by weight of middle chrome paste (50% pigment) dispersed in 22 parts by weight of water are mixed by mechanical stirring for a short time with 69 parts by weight of the bituminous base dispersion produced as described above and 0.3 parts by weight of 20% aluminium sulphate solution. This amounts to 0.06% by weight of aluminum sulfate calculated on the emulsion.

What we claim is:

1. A process for the preparation of stable bituminous base dispersions for use in the production of colored bitumen dispersions having very low viscosity which comprises mixing a substance selected from the group consisting of bitumen and aqueous bitumen dispersions with an aqueous dispersion of a bentonite to form a stable bituminous dispersion of very low viscosity, the total amount of water present in the two components being such that the resultant dispersion contains not more than 25% by weight of bitumen calculated upon the weight of said resultant dispersion excluding the weight of said bentonite; and allowing said dispersion to stand.

2. The process of claim 1 wherein said percentage of bitumen is less than 15%.

3. The process of claim 1 wherein said percentage of bitumen is between 10% and 12%.

4. A process for the preparation of stable bitumen paints of very low viscosity which comprises mixing a substance selected from the group consisting of bitumen and aqueous bitumen dispersions with an aqueous dispersion of bentonite to form a stable dispersion of very low viscosity, the total amount of water present in the two components being such that the resultant dispersion contains not more than 25% by weight of bitumen, said percentage being calculated on the weight of said resultant dispersion excluding the weight of said bentonite; allowing said dispersion to stand, and thereafter adding a pigment to said dispersion to form said paint.

5. The process of claim 1 wherein a trace on the order of 0.05% of aluminum sulfate is added to said resultant dispersion.

LEONARD GOWEN GABRIEL.
JOHN ALFRED RAWLINSON.